US006289089B1

(12) United States Patent
Rippstein

(10) Patent No.: US 6,289,089 B1
(45) Date of Patent: *Sep. 11, 2001

(54) KEY TELEPHONE SYSTEM WITH CORDLESS TERMINALS

(75) Inventor: Eugen Rippstein, Aesch (CH)

(73) Assignee: Siemens Schweiz AG, Zuerich (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,013
(22) PCT Filed: Sep. 9, 1997
(86) PCT No.: PCT/CH97/00332
§ 371 Date: Apr. 30, 1998
§ 102(e) Date: Apr. 30, 1998
(87) PCT Pub. No.: WO98/12861
PCT Pub. Date: Mar. 26, 1998

(30) Foreign Application Priority Data

Sep. 16, 1996 (CH) .................................................. 2261/96

(51) Int. Cl.[7] ...................................................... H04M 1/00
(52) U.S. Cl. ........................... 379/156; 379/165; 379/232; 455/554; 455/555
(58) Field of Search .................................... 455/426, 415, 455/519, 463, 554–555, 566; 379/156–157, 158–159, 165–166, 210–212, 201, 207, 231–234

(56) References Cited

U.S. PATENT DOCUMENTS

| 4,538,028 | 8/1985 | Gazzoli et al. . |
| 4,850,011 | 7/1989 | Delmege et al. . |
| 5,206,901 | 4/1993 | Harlow et al. . |

(List continued on next page.)

FOREIGN PATENT DOCUMENTS

| 624808 | 8/1981 | (CH) . |
| 324058 | 7/1989 | (EP) . |
| 0533510 | 3/1993 | (EP) . |
| 549126 | 6/1993 | (EP) . |
| 653869 | 5/1995 | (EP) . |
| 7240960 | * 9/1995 | (JP) . |

OTHER PUBLICATIONS

*ETSI GSM Technical Specification*, "GSM Global System for Mobile Communications" GSM 01.02, Version 5.0.0 (Mar. 1996).

Primary Examiner—Curtis A. Kuntz
Assistant Examiner—Duc Nguyen
(74) Attorney, Agent, or Firm—Herbert L. Lerner; Laurence A. Greenberg; Werner H. Stemer

(57) ABSTRACT

Key telephone system with a private branch exchange that includes a switching unit, stationary key terminals, and at least one of mobile cordless and GSM terminals. The switching unit is adapted to switch calls to the stationary key terminals and to the at least one of the mobile cordless and GSM terminals. The system also includes a first trunk group and a key server system, in which the stationary key terminals are coupled to the switching unit through the first trunk group and the key server system, at least one additional server comprising a memory unit, and a second trunk group having lines associated with each of the at least one of the mobile cordless and GSM terminals. The at least one additional server further includes an individual switching unit adapted to switch the lines associated with the at least one of the mobile cordless and GSM terminals, and at least one of the stationary key terminals is associated with at least one of at least one mobile cordless terminal and at least one GSM terminal and is associated with the lines associated the at least one of at least one mobile cordless terminal and at least one GSM terminal.

11 Claims, 3 Drawing Sheets

U.S. PATENT DOCUMENTS

| | | | | |
|---|---|---|---|---|
| 5,408,525 | * | 4/1995 | Eldering | 379/162 |
| 5,517,551 | | 5/1996 | Arai . | |
| 5,544,235 | | 8/1996 | Ardon . | |
| 5,655,016 | * | 8/1997 | Emery | 379/374 |
| 5,659,598 | * | 8/1997 | Byrne et al. | 455/436 |
| 5,699,419 | * | 12/1997 | Ardon | 379/156 |
| 5,887,256 | * | 3/1999 | Lu et al. | 455/426 |

* cited by examiner

KEY TELEPHONE SYSTEM WITH CORDLESS TERMINALS

CROSS-REFERENCE TO RELATED APPLICATION

The present application is a U.S. National Stage Application of International Patent Application No. PCT/CH 97/00332 filed Sep. 9, 1997 and claims priority under 35 U.S.C. §119 of Swiss Patent Application No. 2261/96 filed Sep. 16, 1996.

BACKGROUND OF THE INVENTION

1. Field of the Invention

The present invention relates to a key telephone system with cordless terminals in a private branch exchange that includes a switching unit, stationary key terminals, and at least one of mobile cordless and GSM terminals. The switching unit is adapted to switch calls to the stationary key terminals and to the at least one of the mobile cordless and GSM terminals. The system also includes a first trunk group and a key server system, in which the stationary key terminals are coupled to the switching unit through the first trunk group and the key server system.

2. Discussion of Background Information

Apart from simple telephone installations that are connected to a single connection line, there are terminals which, with a talking key, have access to several lines via an additional control panel. With the appropriate connection of numerous such special terminals, numerous systems arise, which, for example, are characterized as executive-secretary, key, key telephone, or broker systems. Three main examples for application of such systems are described in Ohmann, F.: Kommunikations-Endgeräte, Springer-Verlag, Berlin 1983, chapter 4.2.7, pages 187–193:

hierarchically structured work group, work group with a team structure, and central operator to fill in for absentee professionals.

Broker and commissioner systems are particularly important, in which, with reference to external calls, each member of a work group can fill in for every other team member and take his calls. For this, several joint switched lines are led to many terminals. External calls are therefore signaled simultaneously at numerous terminals, so that various team members can take an incoming call.

It is known, for example, that cordless telephone systems that operate in accordance with DECT or GSM standards allow the subscriber to conduct conversations independent of his work station. In EP 0 533 510 A2, a cordless telephone system with key functionality is described, the cordless telephones of which exhibit control keys and indicators, each of which are assigned to a switched line. Furthermore, a register is provided, which contains data concerning the switched lines that are assigned to the cordless telephone. The known cordless key telephone system exhibits the essential performance features of known key telephone systems. As the calling signal is received, the cordless telephone thus tests whether the line linked to the calling signal is assigned to the cordless telephone in question. If this is the case, the call is shown on the display, whereafter the subscriber can take the call by tapping the pertinent key.

The known cordless key telephone system thus exhibits special cordless telephones that require an additional keyboard, an additional register area, as well as the corresponding operations software, and thus they are comparatively expensive. Conventional cordless telephones without key functionality, however, cannot be used. On the other hand, the possibility provided for the subscriber to take calls selectively from various lines is of lesser importance.

SUMMARY OF THE INVENTION

The present invention thus has as its basis the task of creating a key telephone system, in which even conventional cordless telephones can be integrated, which exhibit no special key control panel and line indicators.

This task is solved by the measures cited in patent claim 1. Advantageous embodiments of the invention are cited in further claims.

The cordless key telephone system in accordance with the invention permits the use of conventional cordless telephones, which, like the stationary key terminals, can be integrated into the key telephone system.

The present invention is directed to a key telephone system that includes a switching unit for terminating a plurality of calls, at least one stationary key terminal, and a key server coupled to the at least one stationary key terminal. The at least one key terminal is coupled to the switching unit through a first trunk group having a plurality of lines, and specified lines of the first trunk group are associated with each of the at least one stationary key terminal. The system also includes at least one additional terminal comprising at least one of at least one mobile terminal and at least one GSM terminal, and an additional server coupled to the at least one additional terminal. The additional server is coupled to the switching unit through a second trunk group having a plurality of lines, and specified lines of the second trunk group are associated with each at least one additional terminal. The at least one stationary key terminal and the at least one additional terminal are associated with at least one same line.

In accordance with another feature of the present invention, the additional server includes a memory unit. The memory unit is adapted to store information about the associated specified lines of the second trunk group and each at least one additional terminal.

In accordance with still another feature of the present invention, the additional server includes a switch device to terminate to the at least one additional terminal. Further, the additional server further includes a memory unit that is adapted to store information about the associated specified lines of the second trunk group and each at least one additional terminal. Still further, the switch device is coupled to the memory unit.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

Figure 1:
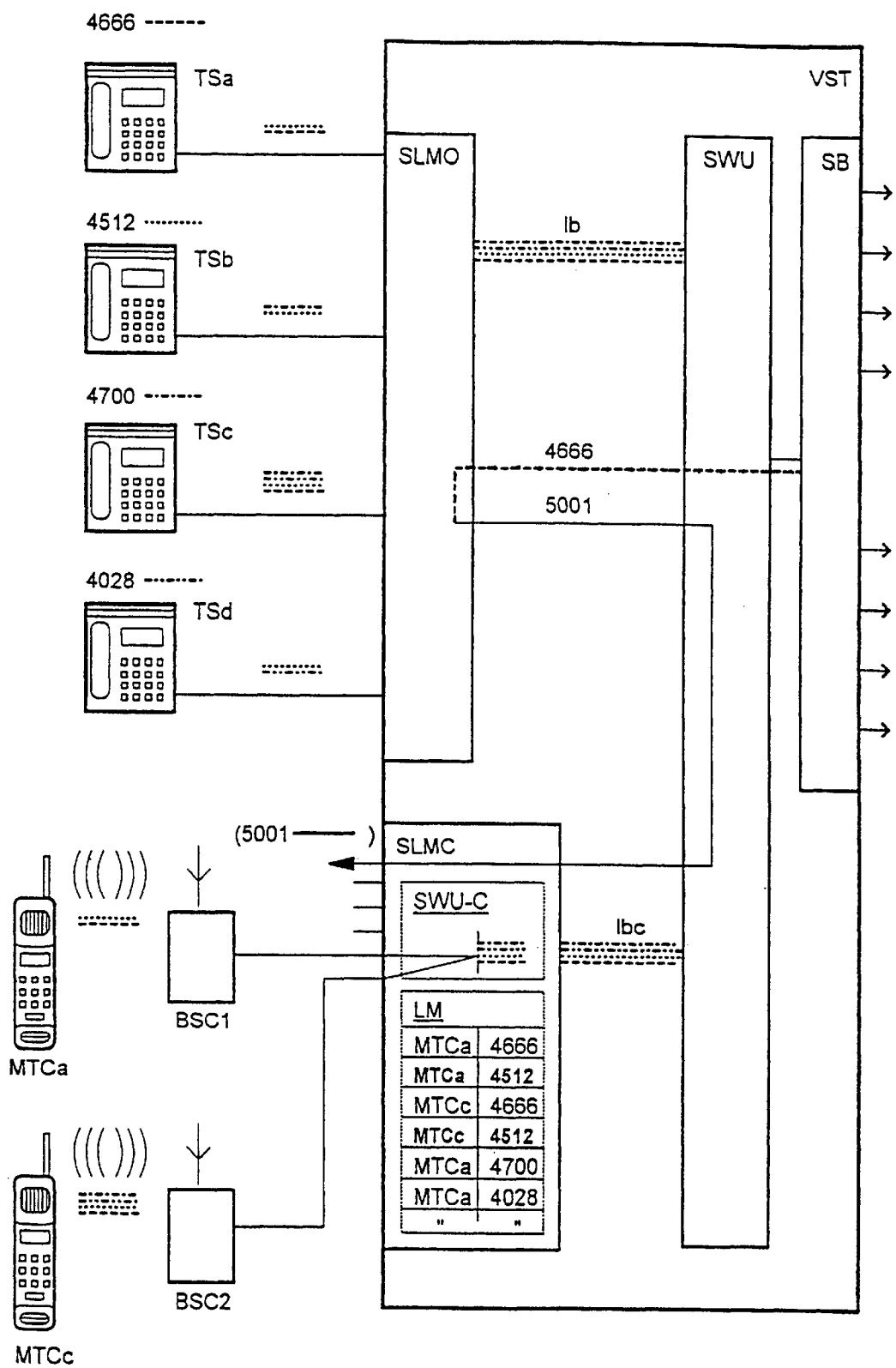
FIG. 1 a key telephone system in accordance with the invention.
Figure 2:
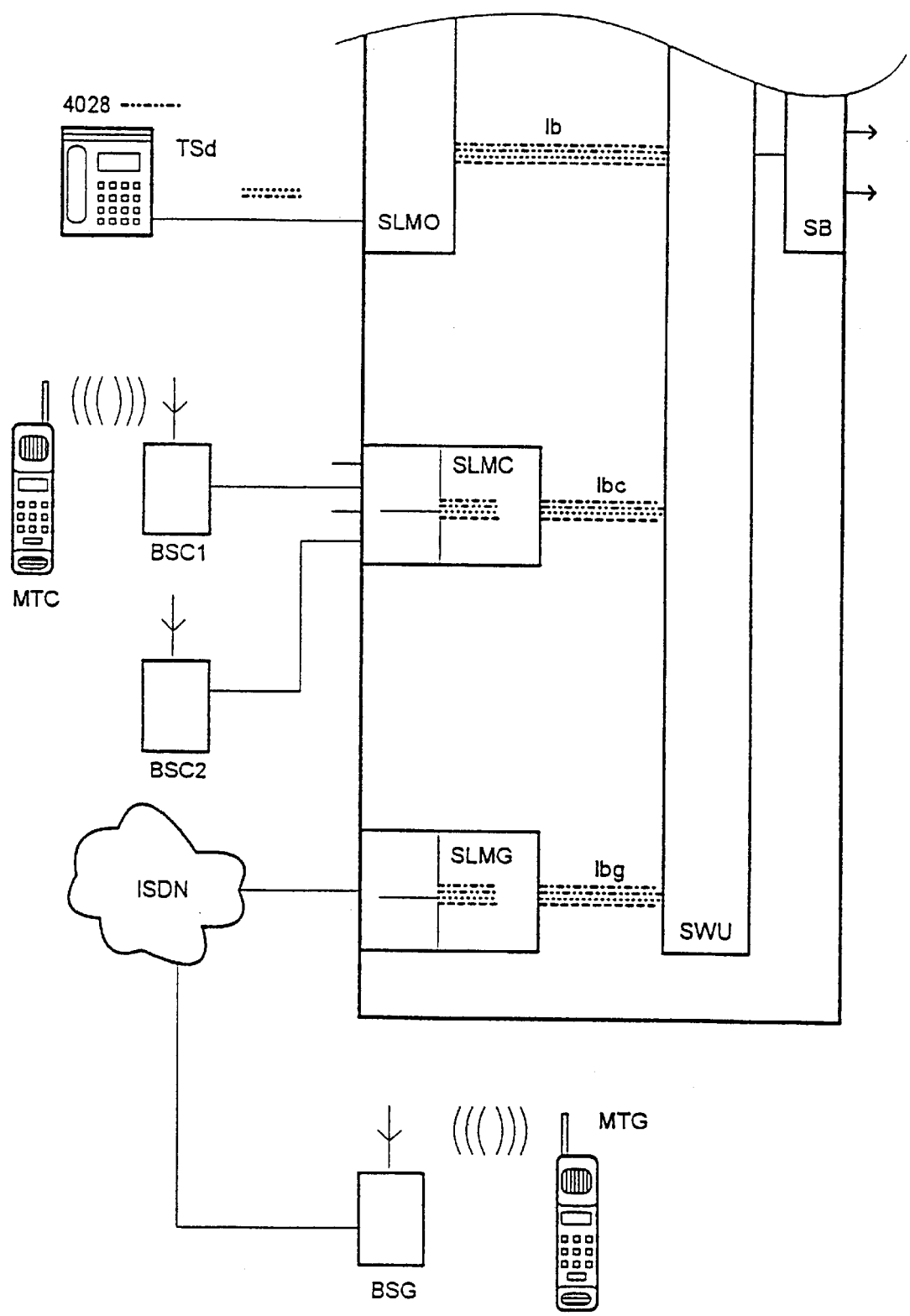
FIG. 2 the key telephone system in accordance with FIG. 1, supplemented by GSM terminal, and FIG. 3 several mobile and stationary terminals belonging to a key installation.

FIG. 1 shows a private branch system VST with a switching unit SWU connected to the public network via an interface stack SB, for example, which switches calls via subscriber line interfaces (Subscriber Line Module) or server module SLMO (Key-System-Server), SLMC (Cordless-Server) and SLMG (the extension with the server module SLMG (GSM-Server) is shown in FIG. 2) to stationary and mobile terminals TSa, TSb, TSc, TSd; MTC, MTG. The mobile terminals MTC and MTG (shown in FIG. 2) are contacted via radio or base stations BSC1, BSC2, or BSG, which are connected to the server module SLMC or SLMG. The key system server SLMO provides the necessary performance features for the key functionality in a known manner.

The coupling of GSM terminals to the base stations BSG, as well as necessary zone changes if appropriate, proceed in accordance with known processes, which are described, for example, in Gerke, P.R.: Digitale Kommunikationsnetze, Springer Verlag, Heidelberg 1991, chapter 6.7. See also the corresponding recommendations of the CEPT (Conférence Europ. des Administrations des Postes et Télécommunications)—Gruppe GSM (Groupe Spéciale Mobile).

The cordless terminals MTC preferably operate in accordance with the DECT process (DECT: Digital European Cordless Telecommunication, European Standard for cordless telephony. DECT operates in the frequency range up to 1900 MHZ with a combined accessing process of frequency multiplexing processes with 10 carrier signals (FDMA) and time-division multiplex method with 24 time divisions (TDMA). With a connection capacity of 120 channels, a maximum of 12 simultaneous duplex connections with 32 kbit/s (net) are available. The maximum range in buildings is limited to 200 m). The DECT process is, inter alia, also described in R. Gerke, loc. cit., page 311.

For the present invention, mobile terminals that operate in accordance with DECT and GSM standards as well as any other process can be used.

According to F. Ohmann, loc. cit., page 193, the performance characteristics and construction stages of the key systems available today are generally influenced by the conditions of the international market. In subscriber numbers of up to 100 they are the most widely distributed kind of private branch system. With smaller key systems (up to approximately 20 subscribers and up to 6 switched lines), each subscriber has specific access to all switched lines (squared system). Larger key systems (up to approximately 100 subscribers and up to 24 switched lines) are designed, such that the individual stations only have access to specific, determined lines (non squared system).

In FIGS. 1 and 2, the lines 1b subscriber numbers 4666, 4512, 4700, and 4028 are led to the Key-System-Server SLMO, from which the key system server SLMO is connected to the key terminal TSa via lines with the subscriber numbers 4666 and 4512; to the key terminal TSb via lines with the subscriber numbers 4512 and 4700, to the key terminal TSc via lines with the subscriber numbers 4666, 4700, 4028, and 4512; and to the key terminal TSd via lines with subscriber numbers 4028 and 4512 (each subscriber number is depicted with a different line). The assignment of the lines to the key terminals each proceeds according to the needs of the subscribers, which often work together in a team. The team members, who, via their stationary key terminals, can selectively access the lines that are assigned to them, often have a cordless telephone at their disposal, so that they can be reached at all times. To date, when leaving the office a call transferred from stationary to mobile terminal was made (or a system in accordance with EP 0 533 510 A2 was used). In FIG. 1 it is apparent that the subscriber with the subscriber number 4666 transferred the calls to his mobile cordless terminal with the subscriber number 5001. On account of the automatic call transfer, the remaining team members could no longer take any calls arriving via the line with the subscriber number 4666. If the subscriber that activated the call transfer no longer has his mobile cordless terminal MTC within range, then the calls to subscriber number 4666 are not answered.

In accordance with the invention, therefore, all lines required by the subscribers are also switched to the cordless server SLMC or to the GSM server SLMG, through which a mobile terminal MTC or MTG is called as soon as a call comes in via one of the lines assigned to the mobile terminal MTC or MTG concerned. It is shown in FIG. 1 that the subscribers with the stationary key terminal TSa or TSc have mobile cordless terminals MTCa or MTCc at their disposal, to which the same lines (subscriber numbers 4666, 4512 or 4666, 4512, 4700, 4028) are assigned, as with the accompanying stationary key terminals TSa and TSc. Via the cordless server SLMC, lines are switched to the mobile cordless terminals MTC when a call comes in. In addition, the cordless server SLMC (or the GSM server SLMG) has a memory unit LM, in which the subscriber numbers assigned to the mobile cordless terminals MTCa or MTCc are deposited. When a call comes in, using the data deposited in the memory unit LM, it is determined to which mobile cordless terminals MTC the line to be connected is assigned. Thereafter, the line is switched to the subscribers concerned via a switching unit SWU-C that is provided in the cordless server SLMC (or the GSM server SLMG). FIG. 1 shows, for example, that the line with the subscriber number 4512 (dotted line) is switched to all stationary and mobile terminals TS or MTC.

It is preferably established in the memory unit LM which lines are assigned priority to the mobile terminals MTCa or MTCc for ongoing calls.

The mobile terminal MTC operating in accordance with the DECT standard permits the indication of the called number on the display (for example, an LCD display) of the device. In this way, the user of the mobile terminal MTC then knows via which line he is being called and can thus take calls selectively. A control panel with an additional display, for example, by means of LED's is thus practically unnecessary. If, for example, the number 4666 is called, then a calling signal is conveyed to the stationary key terminals TSa and TSc as well as to the mobile cordless terminals MTCa and MTCc. The indication of the called numbers occurs at the stationary key terminals TSa and TSc via a luminous diode. On the display of the cordless terminals MTCa and MTCc, however, the number 4666 appears. The subscribers assigned to these terminals TSa, MTCa and TSc, MTCc can, therefore, regardless of whether they are in or out of the office, take calls on subscriber numbers 4666 and 4512 (the subscriber with the terminals TSc and MTCc can also take calls to subscriber numbers 4700 as well as 4028). The advantage thus arises that the absentee subscriber and also the other team members, for example, the secretary, can take subscriber calls directed to the calling numbers assigned to the absentee subscriber.

It is preferable that only the lines are led to the mobile terminals MTC, MTG which are required by the subscriber on a regular basis. For example, only the subscriber numbers of the personal, stationary key terminal TS and the number of a partner are switched, who are responsible for the same domain. Access to all lines for all team members via a mobile terminal MTC, MTG is not necessary in some circumstances. The subscriber with the terminals TSc and MTCc can, for example, access the lines with the subscriber numbers 4666, 4512, 4700, and 4028 via the stationary terminal TSc and, for example, access only the lines with the subscriber numbers 4700 and 4028 via the mobile terminal MTC and/or MTG.

Especially if a display of the called number is not possible, mobile terminals MTC and/or MTG are preferably used, which are suitable for distributing varying calling signals, so that one or more lines that are to be switched can be assigned a special call tone in the cordless server and/or in the GSM server. The subscriber can thus determine via which line he is being called. Processes to create any order of calling signal rhythms in the private branch system VST or in the servers SLMO, SLMC, SLMG provided therein are known to the expert, for example, from CH-PS 624 808.

Figure 3:
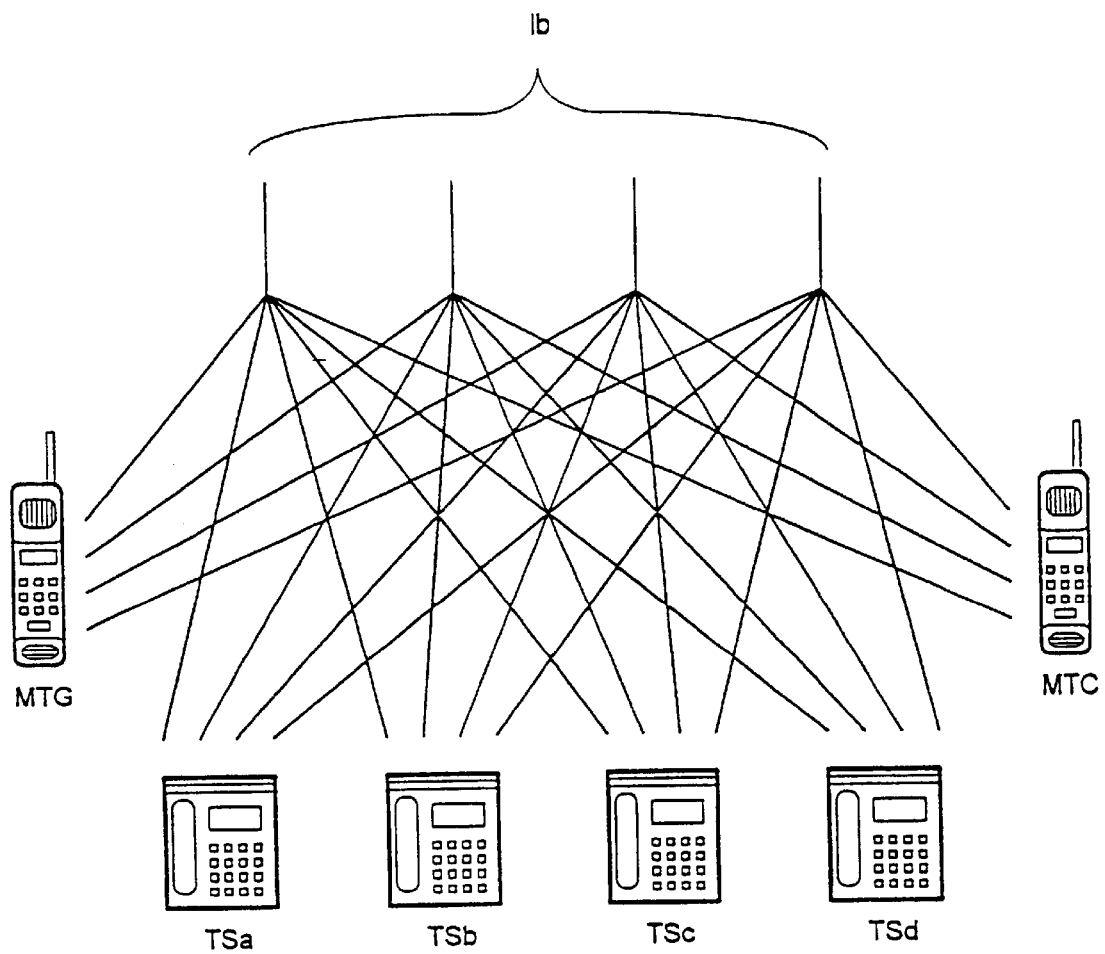

As is depicted in FIG. 3, absentee team members remain connected to the key system even in their absence via their mobile terminals MTC and/or MTG.

I claim:

1. A key telephone system with a private branch exchange comprising:
    a switching unit;
    stationary key terminals;
    at least one of mobile cordless terminals and GSM terminals;
    the switching unit being adapted to terminate calls to the stationary key terminals and to the at least one of the mobile cordless terminals and GSM terminals;
    a first trunk group;
    a key server system, the stationary key terminals being coupled to the switching unit through the first trunk group and the key server system;
    at least one additional server comprising a memory unit;
    a second trunk group comprising lines associated with each of the at least one of the mobile cordless terminals and GSM terminals;
    the at least one additional server further comprising an individual switching unit being adapted to terminate the lines associated with the at least one of the mobile cordless terminals and GSM terminals; and
    at least one of the stationary key terminals being associated with at least one of at least one mobile cordless terminal and at least one GSM terminal of the at least one of the mobile cordless terminals and GSM terminals, and being associated with lines associated with each mobile cordless terminal and GSM terminal.

2. The key telephone system in accordance with claim 1, the memory unit storing information related to which lines are associated with each of the at least one of the mobile cordless terminals and GSM terminals.

3. The key telephone system in accordance with claim 1, the at least one additional server being adapted to transmit a called number and the mobile terminals being adapted to display the called number.

4. The key telephone system in accordance with claim 1, wherein a plurality of calls are associated and forwarded to the lines coupled to the individual switching unit.

5. The key telephone system in accordance with claim 4, wherein each line is assigned a special call tone in the at least one additional server.

6. The key telephone system in accordance with claim 1, the mobile cordless terminals being adapted to operate in accordance with one of a DECT and GSM standard.

7. A key telephone system comprising:
    a switching unit for terminating a plurality of calls;
    at least one stationary key terminal;
    a key server coupled to the at least one stationary key terminal, and the at least one key terminal being coupled to the switching unit through a first trunk group having a plurality of lines, wherein specified lines of the first trunk group are associated with each of the at least one stationary key terminal;
    at least one additional terminal comprising at least one of at least one mobile terminal and at least one GSM terminal;
    an additional server coupled to the at least one additional terminal;
    the additional server being coupled to the switching unit through a second trunk group having a plurality of lines, wherein specified lines of the second trunk group are associated with each at least one additional terminal; and
    the at least one stationary key terminal and the at least one additional terminal being associated with at least one same line.

8. The key telephone system in accordance with claim 7, the additional server comprising a memory unit; and
    the memory unit being adapted to store information about the associated specified lines of the second trunk group and each at least one additional terminal.

9. The key telephone system in accordance with claim 7, the additional server comprising a switch device to terminate to the at least one additional terminal.

10. The key telephone system in accordance with claim 9, the additional server further comprising a memory unit; and
    the memory unit being adapted to store information about the associated specified lines of the second trunk group and each at least one additional terminal.

11. The key telephone system in accordance with claim 10, the switch device being coupled to the memory unit.

* * * * *